United States Patent
Tang

(10) Patent No.: US 10,313,897 B2
(45) Date of Patent: Jun. 4, 2019

(54) METHODS AND APPARATUS TO PREVENT POTENTIAL CONFLICTS AMONG INSTANCES OF SON FUNCTIONS

(71) Applicant: NOKIA SOLUTIONS AND NETWORKS OY, Espoo (FI)

(72) Inventor: Haitao Tang, Espoo (FI)

(73) Assignee: NOKIA SOLUTIONS AND NETWORKS OY, Espoo (ET)

( * ) Notice: Subject to any disclaimer, the term of this patent is extended or adjusted under 35 U.S.C. 154(b) by 34 days.

(21) Appl. No.: 15/306,818

(22) PCT Filed: May 5, 2014

(86) PCT No.: PCT/EP2014/059109
§ 371 (c)(1),
(2) Date: Oct. 26, 2016

(87) PCT Pub. No.: WO2015/169333
PCT Pub. Date: Nov. 12, 2015

(65) Prior Publication Data
US 2017/0055165 A1  Feb. 23, 2017

(51) Int. Cl.
*H04W 24/02* (2009.01)
*H04L 12/24* (2006.01)
*H04W 84/18* (2009.01)

(52) U.S. Cl.
CPC ......... *H04W 24/02* (2013.01); *H04L 41/0873* (2013.01); *H04W 84/18* (2013.01)

(58) Field of Classification Search
CPC . H04W 24/02; H04W 72/0413; H04W 84/18; H04L 41/04; H04L 41/0873
See application file for complete search history.

(56) References Cited

U.S. PATENT DOCUMENTS

| | | | |
|---|---|---|---|
| 2013/0242720 A1* | 9/2013 | Chou | ............... H04W 72/0413 370/221 |
| 2014/0040450 A1* | 2/2014 | Sanneck | ................. H04L 41/04 709/223 |

FOREIGN PATENT DOCUMENTS

| | | |
|---|---|---|
| CN | 103379660 A | 10/2013 |
| CN | 103428877 A | 12/2013 |

(Continued)

OTHER PUBLICATIONS

International Search Report and Written Opinion dated Feb. 2, 2015 corresponding to International Patent Application No. PCT/EP2014/059109.

(Continued)

*Primary Examiner* — Vinncelas Louis
(74) *Attorney, Agent, or Firm* — Squire Patton Boggs (US) LLP

(57) ABSTRACT

Methods are provided to prevent a potential conflict among first and second instances of SON functions. A first input impact time, first input scope and first objective of the first instance, and a second input impact time, second input scope and second objective of the second instance are obtained. If there is a first overlap among the first input impact time and the second input impact time, whether there is a second overlap among the first input scope and the second input scope is determined. If there is the second overlap, whether the first objective and the second objective are the same or substantially the same is determined. If so, it is determined that the potential conflict exists. If there is the second overlap, whether the first objective contradicts or substantially contradicts with the second objective is determined. If so, it is determined that the potential conflict exists.

20 Claims, 7 Drawing Sheets

(56) References Cited

FOREIGN PATENT DOCUMENTS

| | | |
|---|---|---|
| CN | 103477673 A | 12/2013 |
| WO | WO 2012/143055 A1 | 10/2012 |
| WO | WO-2012143055 A1 * | 10/2012 ............ H04W 84/18 |

OTHER PUBLICATIONS

3GPP TS 28.628 V11.3.0 (Sep. 2013), Technical Specification, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11), Sep. 2013, 56 pages.

Nokia Siemens Networks, "SON coordination: Conflicts and their categorization," 3GPP Draft; S5-113659, 3GPP TSG SA WG5 (Telecom Management) Meeting #80, Nov. 14-18, 2011; San Francisco, USA, Nov. 4, 2011, XP050578819, 9 pages.

Chinese Office Action issued in corresponding Chinese Patent Application No. 201480078538.2 dated Mar. 12, 2019.

\* cited by examiner

METHODS AND APPARATUS TO PREVENT POTENTIAL CONFLICTS AMONG INSTANCES OF SON FUNCTIONS

TECHNICAL FIELD

Example embodiments disclosed herein relate to communication networks, particularly, to self-organizing networks.

BACKGROUND

The evolvement of communication technology, especially the wireless communication technology, has increased the complexity of networks and the amount of network nodes, thereby increasing operation and maintenance tasks i.e. management tasks. To automate at least some of the tasks a concept called a self-organizing network (SON) is introduced by Next Generation Mobile Networks (NGMN) Alliance and 3GPP (Third Generation Partnership Project) to be used first in long term evolution (LTE) access networks, and later on in other networks, both in access and core networks. A self-organizing network is capable to self-configure and continuously self-optimize itself in response to network and traffic changes. In such a network, the network and/or a network node alters automatically, preferably without human involvement, its configuration parameters, such as transmission and/or reception parameters, by means of different self-organizing network functions. Since monitored network behavior triggers execution of one or more self-organizing function instances, it may happen that several independent self-organizing function instances are active concurrently in the same network area with different targets. Thus, it would be useful to coordinate the self-organizing network functions. One challenge for the coordination is that "plug and play" network elements that support self-organizing network functionality can be bought from any vendor, and instead of buying single network elements, a communication service provider may buy vendor-specific domains, and/or organize network elements bought from different vendors to different vendor-specific domains, each covering a geographical area and not knowing the run-time situation of other domains.

BRIEF DESCRIPTION OF THE DRAWINGS

Example embodiments disclosed throughout the Detailed Description will be described in greater detail with reference to accompanying drawings, in which.

DETAILED DESCRIPTION

The embodiments disclosed throughout this Detailed Description are examples. Although this Detailed Description may refer to "an", "one", or "some" example embodiment(s) in several locations, this does not necessarily mean that each such reference is to the same example embodiment(s), or that the feature only applies to a single example embodiment. Single features of different example embodiments may also be combined to provide other example embodiments.

The example embodiments disclosed throughout this Detailed Description are applicable to any communication system or any combination of different communication systems and corresponding networks and network elements (including "plug and play" network elements") that support self-organizing network functionality. The communication system may be a wireless communication system or a communication system utilizing both fixed networks and wireless networks or a fixed communication system. Furthermore, the communication system may be used in any radio access network, core network and any self-organizing network (SON). The specifications of communication systems and networks, especially in wireless communication, develop rapidly. Such development may require extra changes to an example embodiment. Therefore, all words and expressions should be interpreted broadly and they are intended to illustrate, not to restrict, the example embodiments.

Figure 1:
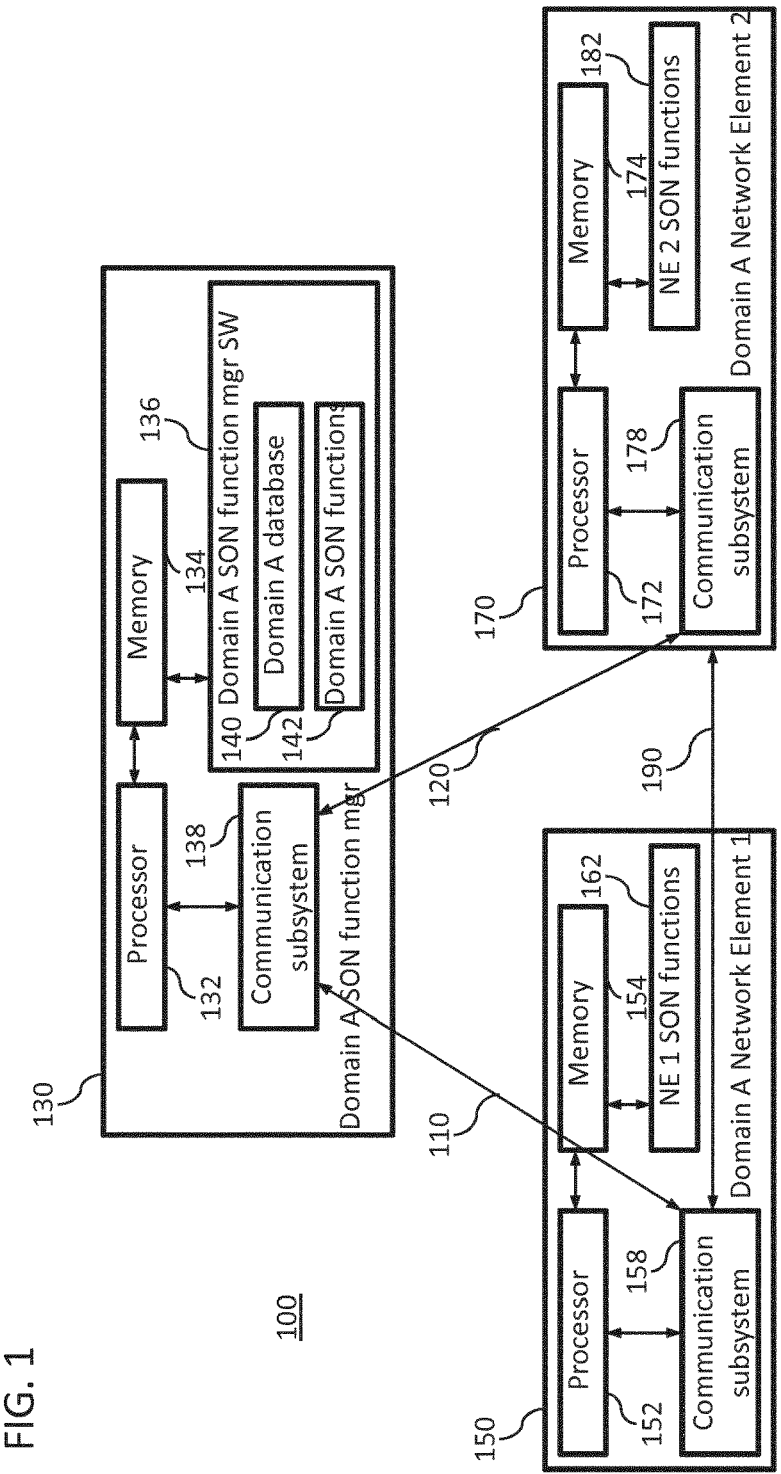
FIG. 1 is a block diagram illustrating a communication system, according to an example embodiment.

FIG. 1 illustrates communication system 100, that includes a SON function manager 130 that is configured to manage SON functions for a particular domain (referred to in FIG. 1 and in the discussion of FIG. 1 as Domain A), and two network elements 150 and 170 of Domain A. As discussed throughout this Detailed Description, a domain can be defined as a designated section of a radio access network. In example embodiments, the section can be designated by the network elements located in a particular geographical area and/or the network elements that are managed by a particular vendor.

In an example embodiment, Domain A SON function manager 130 is a computing device including a processor 132 configured to execute SON function manager software application 136 for Domain A. Processor 132 is communicatively connected to and interacts directly or indirectly with memory 134 and communication subsystem 138. Memory 134 stores SON function manager software application 136 for Domain A (which includes a database 140, SON functions 142 for Domain A, and methods 300-700 (of FIGS. 3-7, but not shown in FIG. 1) for preventing potential conflicts among SON functions). Communication subsystem 138 sends and receives communications (such as for example requests to execute a SON function instance, requests to output at least one information element by a SON function instance, responses to the requests, and information about SON function instances) to and from processor 132.

Regarding the SON functions discussed throughout this Detailed Description, in example embodiments, a number of different SON functions could be used for automatically performing management actions, such as fault, configuration, accounting, performance and security management. Examples of SON functions include mobility load balancing, handover optimization, coverage and capacity optimization, cell outage management, and mobility robustness optimization.

In an example embodiment, Domain A Network Element 1 150 is a computing device including a processor 152 configured to execute SON function instances 162 for Network Element 1 that is within Domain A. Processor 152 is communicatively connected to and interacts directly or indirectly with memory 154 and communication subsystem 158. Memory 154 stores Network Element 1 SON functions 162. Communication subsystem 158 sends and receives communications (such as for example requests to execute a SON function instance, requests to output at least one information element by a SON function instance, responses to the requests, and information about SON function instances) to and from processor 152.

In an example embodiment, Domain A Network Element 2 170 is a computing device including a processor 172 configured to execute instances of SON functions 182 for Network Element 2 that is within Domain A. Processor 172 is communicatively connected to and interacts directly or indirectly with memory 174 and communication subsystem 178. Memory 174 stores Network Element 2 SON functions 182. Communication subsystem 178 sends and receives communications (such as for example requests to execute a SON function instance, requests to output at least one information element by a SON function instance, responses to the requests, and information about SON function instances) to and from processor 172.

Communication subsystem 138 (of Domain A SON function manager 130) is communicatively connected to and interacts directly or indirectly with communication subsystem 158 (of Domain A Network Element 1150) using interface 110. Accordingly, it is through communication subsystems 138 and 158 and interface 110, that processor 152 is communicatively connected to and interacts directly or indirectly with processor 132 and Domain A database 140.

Communication subsystem 138 also is communicatively connected to and interacts directly or indirectly with communication subsystem 178 (of Domain A Network Element 2 170) using interface 120. Accordingly, it is through communication subsystems 138 and 178 and interface 120, that processor 172 is communicatively connected to and interacts directly or indirectly with processor 132 and Domain A database 140.

Communication subsystem 158 is communicatively connected to and interacts directly or indirectly with communication subsystem 178 using interface 190. Accordingly, it is through communication subsystems 158 and 178 and interface 120, that processor 152 is communicatively connected to and interacts directly or indirectly with processor 172.

Figure 2:
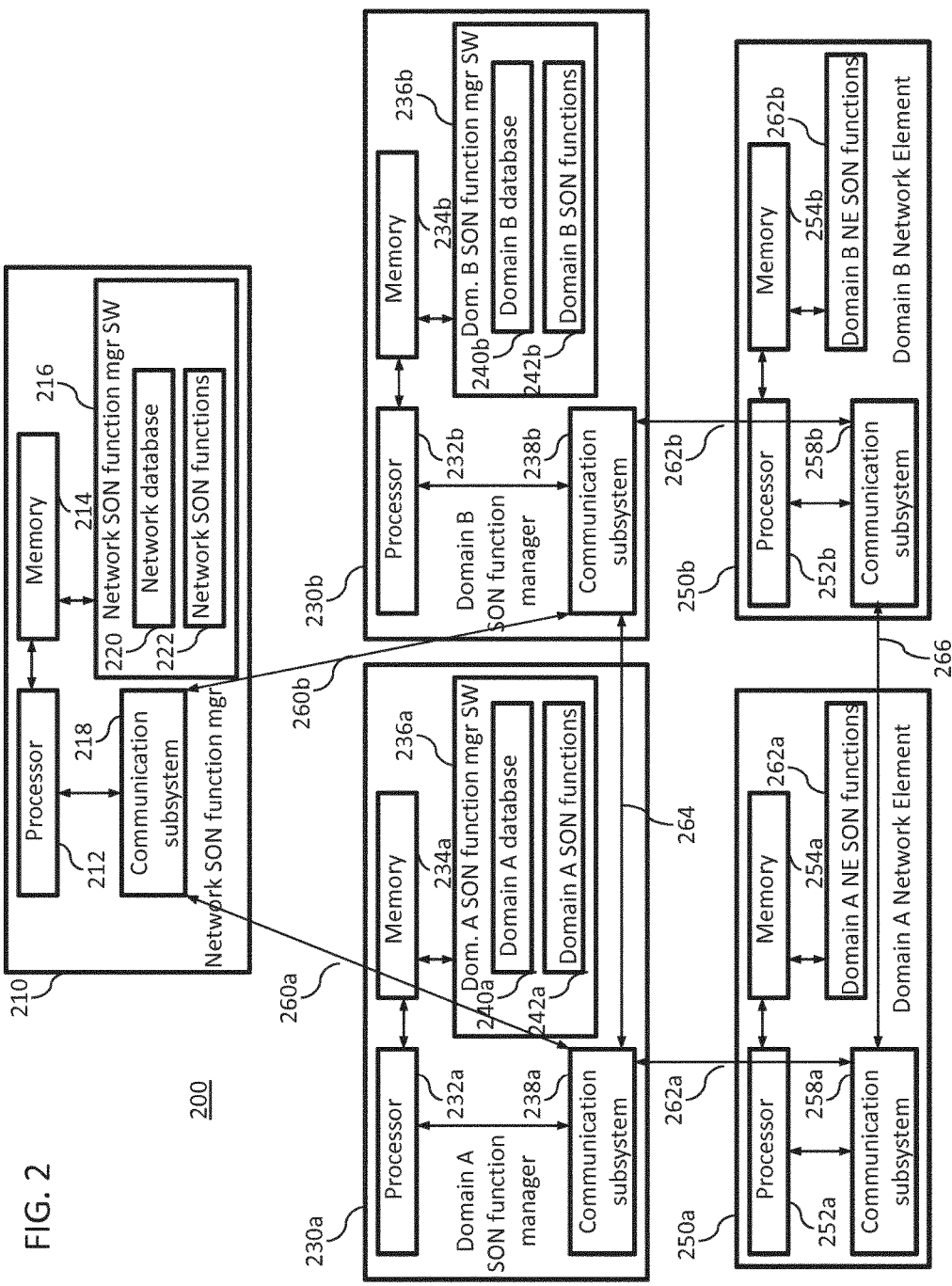
FIG. 2 is a block diagram illustrating a communication system, according to an example embodiment.

FIG. 2 illustrates communication system 200, that includes: a network SON function manager 210 configured to manage SON functions for two domains (referred to in FIG. 2 and the discussion of FIG. 2 as Domains A and B); SON function manager 230a configured to manage SON functions for Domain A; SON function manager 230b configured to manage SON functions for Domain B; network element 250a of Domain A; and network element 250b of Domain B.

In an example embodiment, network SON function manager 210 is a computing device including a processor 212 configured to execute SON function manager software application 216 for Domains A and B. Processor 212 is communicatively connected to and interacts directly or indirectly with memory 214 and communication subsystem 218. Memory 214 stores SON function manager software application 216 for Domains A and B (which includes a database 220, SON functions 222 for Domains A and B, and methods 300-700 (of FIGS. 3-7, but not shown in FIG. 2) for preventing potential conflicts among SON functions). Communication subsystem 218 sends and receives communications (such as for example requests to execute a SON function instance, requests to output at least one information element by a SON function instance, responses to the requests, and information about SON function instances) to and from processor 212.

In an example embodiment, Domain A SON function manager 230a is a computing device including a processor 232a configured to execute SON function manager software application 236a for Domain A. Processor 232a is communicatively connected to and interacts directly or indirectly with memory 234a and communication subsystem 238a. Memory 234a stores SON function manager software application 236a for Domain A (which includes a database 240a, SON functions 242a for Domain A, and methods 300-700 (of FIGS. 3-7, but not shown in FIG. 2) for preventing potential conflicts among SON functions). Communication subsystem 238a sends and receives communications (such as for example requests to execute a SON function instance, requests to output at least one information element by a SON function instance, responses to the requests, and information about SON function instances) to and from processor 232a.

In an example embodiment, Domain B SON function manager 230b is a computing device including a processor 232b configured to execute SON function manager software application 236b for Domain B. Processor 232b is communicatively connected to and interacts directly or indirectly with memory 234b and communication subsystem 238b. Memory 234b stores SON function manager software application 236b for Domain B (which includes a database 240b, SON functions 242b for Domain B, and methods 300-700 (of FIGS. 3-7, but not shown in FIG. 2) for preventing potential conflicts among SON functions). Communication subsystem 238b sends and receives communications (such as for example requests to execute a SON function instance, requests to output at least one information element by a SON function instance, responses to the requests, and information about SON function instances) to and from processor 232b.

In an example embodiment, Domain A Network Element 250a is a computing device including a processor 252a configured to execute instances of SON functions 262a for network element 250a that is within Domain A. Processor 252a is communicatively connected to and interacts directly or indirectly with memory 254a and communication subsystem 258a. Memory 254a stores SON functions 262a for Domain A Network Element 250a. Communication subsystem 258a sends and receives communications (such as for example requests to execute a SON function instance, requests to output at least one information element by a SON function instance, responses to the requests, and information about SON functions) to and from processor 252a.

In an example embodiment, Domain B Network Element 250b is a computing device including a processor 252b configured to execute instances of SON functions 262b for network element 250b that is within Domain B. Processor 252b is communicatively connected to and interacts directly or indirectly with memory 254b and communication subsystem 258b. Memory 254b stores SON functions 262b for Domain B Network Element 250b. Communication subsystem 258b sends and receives communications (such as for example requests to execute a SON function instance, requests to output at least one information element by a SON function instance, responses to the requests, and information about SON function instances) to and from processor 252b.

Communication subsystem 218 (of Network SON function manager 210) is communicatively connected to and interacts directly or indirectly with communication subsystem 238a (of Domain A SON function manager 230a) using interface 260a. Accordingly, it is through communication subsystems 218 and 238a and interface 260a, that processor 232a is communicatively connected to and interacts directly or indirectly with processor 212 and Network database 220.

Communication subsystem 218 also is communicatively connected to and interacts directly or indirectly with communication subsystem 238b (of Domain B SON function manager 230b) using interface 260b. Accordingly, it is through communication subsystems 218 and 238b and interface 260b, that processor 232b is communicatively connected to and interacts directly or indirectly with processor 212 and Network database 220.

Communication subsystem 238a is communicatively connected to and interacts directly or indirectly with communication subsystem 238b using interface 264. Accordingly, it is through communication subsystems 238a and 238b and interface 264, that processor 232a is communicatively connected to and interacts directly or indirectly with processor 232b and Domain B database 240b. Similarly, it is through communication subsystems 238b and 238a and interface 264, that processor 232b is communicatively connected to and interacts directly or indirectly with processor 232a and Domain A database 240a.

Communication subsystem 238a is communicatively connected to and interacts directly or indirectly with communication subsystem 258a (of Domain A Network Element 250a) using interface 262a. Accordingly, it is through communication subsystems 238a and 258a and interface 262a, that processor 252a is communicatively connected to and interacts directly or indirectly with processor 232a and Domain A database 240a.

Communication subsystem 238b is communicatively connected to and interacts directly or indirectly with communication subsystem 258b (of Domain B Network Element 250b) using interface 262b. Accordingly, it is through communication subsystems 238b and 258b and interface 262b, that processor 252b is communicatively connected to and interacts directly or indirectly with processor 232b and Domain B database 240b.

Communication subsystem 258a is communicatively connected to and interacts directly or indirectly with communication subsystem 258b using interface 266. Accordingly, it is through communication subsystems 258a and 258b and interface 266, that processor 252a is communicatively connected to and interacts directly or indirectly with processor 252b.

In example embodiments, processors 132, 152 and 172 of FIG. 1 and processors 212, 232a, 232b, 252a and 252b of FIG. 2, each include hardware or software or any combination of hardware or software.

In example embodiments, memories 134, 154 and 174 of FIG. 1 and memories 214, 234a, 234b, 254a and 254b of FIG. 2 are each persistent stores, such as for example flash memory, read-only (ROM) memory or other similar storage.

In example embodiments, Domain A database 140 of FIG. 1, and Network database 220, Domain A database 240a and Domain B database 240b of FIG. 2, can be of any type and can be different types from each other. For a given SON function manager software application, its database can store the following information for each SON function that is also stored in the SON function manager software application: an input impact time, an input scope, information elements of the input scope, an objective, an output impact time, an impact area, and information elements of the impact area. The database may also store such information for other SON functions that are not stored in the SON function manager software application. The database may also store network-specific or domain-specific topology and/or network element information. It should be appreciated that the content in the database depends on implementation details and configuration of a corresponding network or domain SON function manager. Further, it should be appreciated that it bears no significance where the database, or part of the database, is located, and whether or not some databases, are integrated together.

In example embodiments, interfaces 110 and 120 of FIG. 1 are domain specific management interfaces (such as for example itf-S interfaces), and interfaces 260a, 260b, 262a and 262b of FIG. 2, are network management interfaces (such as for example Itf-N interfaces). In another example embodiment, interfaces 110 and 120 are also network management interfaces. In example embodiments, interface 190 of FIG. 1 and interfaces 264 and 266 of FIG. 2 are peer-to-peer interfaces, such as for example: inter-base station interfaces (such for example X2 interfaces) and inter-domain manager interfaces (such as for example Itf-P2P interfaces). In example embodiments, any of the interfaces 110, 120, 260a, 260b, 262a, 262b, 190, 264 and 266 can be defined by a network operator, or by vendors of the SON function managers and network elements, or can be a standardized interface.

FIGS. 1 and 2 illustrate communication systems 100 and 200 having a simplified architecture and therefore only some elements and functions are shown. The illustrated elements and functions are all logical units, whose implementation may differ from what is shown in FIGS. 1 and 2. The connections shown in FIGS. 1 and 2 are logical connections; the actual physical connections may be different. It is apparent to a person skilled in the art that the systems also include other elements and functions, including other SON functions that are not illustrated or discussed in this Detailed Description.

It bears no significance in example embodiments how SON functions are allocated (i.e. distributed, centralized and hybrid/multi-layer manner allocations may be used). Furthermore, example embodiments are implementable regardless of where the SON functions are implemented (for example at network element level, at domain SON function manager level, and/or at network SON function manager level).

FIGS. 3-7 illustrate methods 300-700 to prevent a potential conflict among a first instance of a first SON function, and a second instance of a second SON function. As disclosed throughout this Detailed Description, a potential conflict can be defined as a scenario in which at least one information element output by a first instance would make at least a substantial impact on at least one information element collected, decision making and/or at least one information element output by a second instance. Examples of such substantial impact are: the first instance affecting the originally intended operation of the second instance and lowering the corresponding performance of the second instance; the first instance distorting the input to the second instance, the first instance blocking the execution of the second instance, the first instance canceling the intended action of the second instance, the first instance canceling the change made by the second instance, the first instance deleting or diminishing the performance gain achievable by the second instance, the first instance competing with the second instance to solve the problem that could be solved by the second instance alone. Furthermore, a potential conflict is directional from one instance to another. In other words, when a first instance conflicts with a second instance in a particular way, this does not mean that the second instance conflicts with the first instance in the same way.

The methods 300-700 can be implemented by any of processors 132, 152 and 172 of FIG. 1 and processors 212, 232a, 232b, 252a and 252b of FIG. 2. In an example embodiment, any of the methods 300-700 is executed in response to receiving a request to execute the first instance or a request to output at least one information element by the first instance. The request may originate and be sent in a communication from any of processors 132, 152 and 172 of FIG. 1 and processors 212, 232a, 232b, 252a and 252b of FIG. 2, that is communicatively connected to the processor executing the method. For example, if processor 132 (of FIG. 1) were executing method 300, it would do so in response to receiving a request to execute the first instance or request to output at least one information element by the first instance, received from another processor communicatively connected to processor 132. Examples of such a request are: "power up", "cell a1, tilt-up delta 2 degrees", "change transmission power by x amount", and "increase 20% of cell a2's coverage towards failed cell a3".

Figure 3:
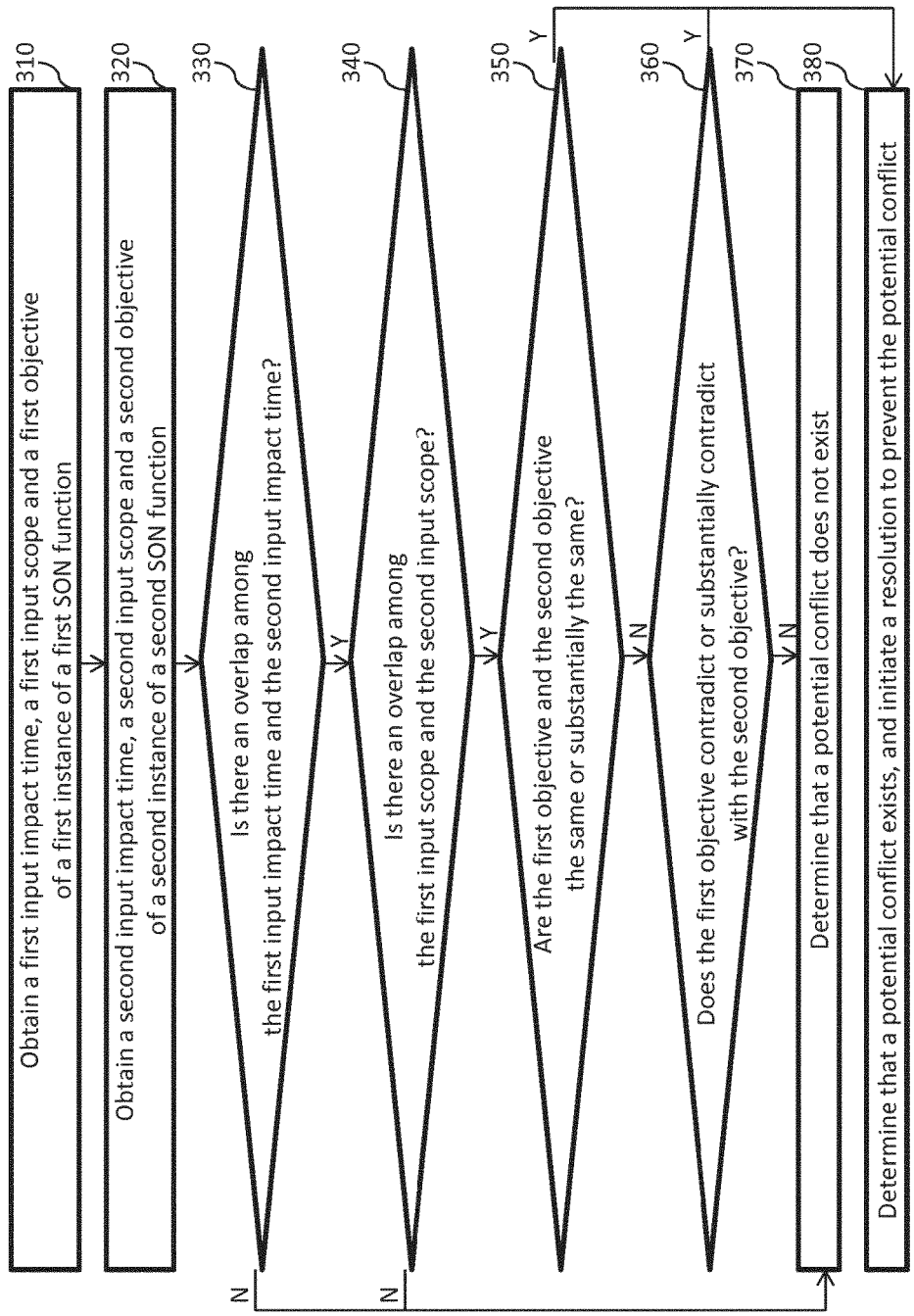
FIG. 3 is a flow chart illustrating a method to prevent a potential conflict among a first instance of a self-organizing network (SON) function and a second instance of a SON function, according to an example embodiment.

FIG. 3 illustrates a method 300 to prevent a potential conflict among a first instance of a first SON function, and a second instance of a second SON function.

At 310, an input impact time, an input scope and an objective of a first instance of a first SON function are obtained. As disclosed throughout this Detailed Description: an instance of a SON function (also referred to throughout this Detailed Description as a SON function instance, a first instance, or a second instance) can be defined as a run-time process that instantiates a SON function in a network environment; an input impact time can be defined as the time period that at least one information element input to a SON function instance would be impacted, by at least one information element that is output by another SON function instance; an input scope can be defined as at least one information element that a SON function instance collects in order to execute; an information element can be defined as a piece of data; and an objective of a SON function instance can be defined as a goal of the SON function instance. In an example embodiment, an information element is a piece of data about one of: a network element or multiple network elements (such as for example a user equipment (UE), a cell, a cell pair, cell neighbors, a cell cluster), a sub-network or even the entire network. Example information elements are pieces of data about: a UE's behavior, a cell's characteristics, a home subscriber server (HSS)/home location register (HLR) entry, and an operations support system (OSS) record. Example objectives of SON function instances are: increase capacity of a cell and minimize handovers of signals from one cell to another.

In an example embodiment, any one of the input impact time, the input scope and the objective of the first instance of the first SON function may be obtained by the processor executing method 300, from a database communicatively connected to that processor. For example, if processor 132 (of FIG. 1) were executing method 300, and Domain A database 140 (of FIG. 1) stored the input impact time, the input scope and the objective of the first instance, processor 132 could obtain these items from database 140 because it is communicatively connected to it. In another example, if processor 152 (of Domain A) were executing method 300, and Domain A database 140 stored the input impact time, the input scope and the objective of the first instance, processor 152 could obtain these items from database 140, because it is communicatively connected to it.

In another example embodiment, any one of the input impact time, the input scope and the objective of the first instance may be sent to the processor that is executing method 300, from another processor communicatively connected to that processor. Any one of the input impact time, the input scope and the objective, may be sent to the processor that is executing method 300, from another processor, in a request to execute the first instance or a request to output at least one information element by the first instance.

320 is next. At 320, an input impact time, an input scope and an objective of an instance of a second SON function are obtained.

In an example embodiment, the input impact time, the input scope and the objective of the second instance may be obtained by the processor, from a database communicatively connected to that processor. For example, if processor 232a (of FIG. 2) were executing method 300, and Network database 220 (of FIG. 2) stored the input impact time, the input scope and the objective of the second instance, processor 232a could obtain these items from Network database 220 because it is communicatively connected to database 220 through communications subsystems 238a and 218 and interface 260a. An example scenario in which a network database (such as network database 220) would store the input impact time, the input scope and the objective of the second instance, is when the second SON function resides in a different domain that the first SON function, and a database within the domain of the first instance does not store information about the second instance.

330 is next. At 330, whether there is an overlap among the input impact time of the first instance and the input impact time of the second instance, is determined. If there is an overlap, 340 is next. If there is not an overlap, 370 is next.

At 340, whether there is an overlap among the input scope of the first instance and the input scope of the second instance, is determined. If there is an overlap, 350 is next. If there is not an overlap, 370 is next.

At 350, whether the objective of the first instance and the objective of the second instance are the same or substantially the same, is determined. If they are the same or substantially the same, 380 is next. If they are not the same or substantially the same, 360 is next.

At 360, whether the objective of the first instance contradicts or substantially contradicts with the objective of the second instance, is determined. If the objectives contradict or substantially contradict each other, 380 is next. If the objectives do not contradict or substantially contradict each other, 370 is next.

At 370, it is determined that a potential conflict does not exist.

At 380, it is determined that a potential conflict exists, and a resolution to prevent the potential conflict is initiated.

Figure 4:
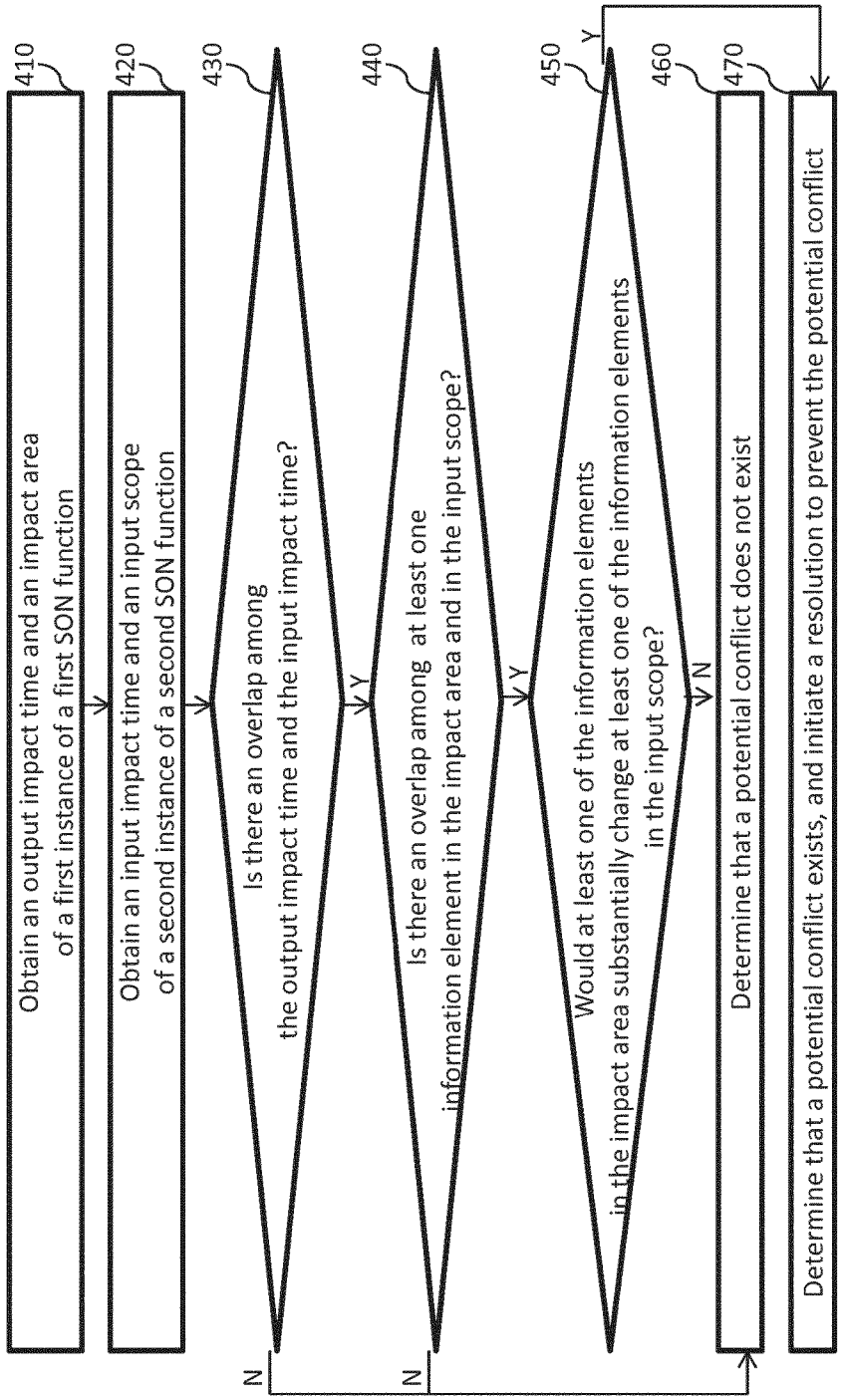
FIG. 4 is a flow chart illustrating a method to prevent a potential conflict among a first instance of a SON function and a second instance of a SON function, according to an example embodiment.

FIG. 4 illustrates another method 400 to prevent a potential conflict among a first instance of a first SON function, and a second instance of a second SON function.

At 410, an output impact time and an impact area of a first instance of a first SON function is obtained.

As disclosed throughout this Detailed Description, an output impact time can be defined as the time period that at least one information element output by a SON function instance would impact: at least one information element input to another SON function instance or at least one information element output by the other SON function instance.

Furthermore, as disclosed throughout this Detailed Description, an impact area can be defined as at least one information element output by a SON function instance and any other information element(s) affected by the information element(s) output by the SON function instance. An example of how an information element output by a SON function instance could affect other information elements is as follows. A SON function instance changes the power parameter of cell 1 and this results in a coverage change of cell 1. The resulted coverage change of cell 1 affects information elements of cell 2, a neighbor of cell 1. In this example, both the power parameter of cell 1 and the affected information elements of cell 2 make up the impact area.

In an example embodiment, any one of the output impact time and impact area of the first instance may be obtained by the processor executing method 400, from a database communicatively connected to that processor.

In another example embodiment, any one of the output impact time and the impact area of the first instance may be sent to the processor that is executing method 400, from another processor communicatively connected to that processor. In an example embodiment, any one of the output impact time and the impact area, may be received by the processor that is executing method 400, from another processor that is requesting to execute the first instance or requesting to output at least one information element by the first instance.

420 is next. At 420, an input impact time and an input scope of a second instance of a second SON function is obtained. In an example embodiment, the input impact time and the input scope may be obtained by the processor executing method 400, from a database communicatively connected to that processor.

430 is next. At 430, whether there is an overlap among the output impact time of the first instance and the input impact time of the second instance, is determined. If there is an overlap, 440 is next. If there is not an overlap, 460 is next.

At 440, whether there is an overlap among at least one information element in the impact area of the first instance and in the input scope of the second instance, is determined. If there is an overlap, 450 is next. If there is not an overlap, 460 is next.

At 450, whether at least one of the information elements in the impact area of the first instance would substantially change at least one of the information elements in the input scope of the second instance, is determined. If at least one of the information elements in the input scope would be substantially changed, 470 is next. If none of the information elements in the input scope would be substantially changed, 460 is next.

At 460, it is determined that a potential conflict does not exist.

At 470, it is determined that a potential conflict exists, and a resolution to prevent the potential conflict is initiated.

Figure 5:
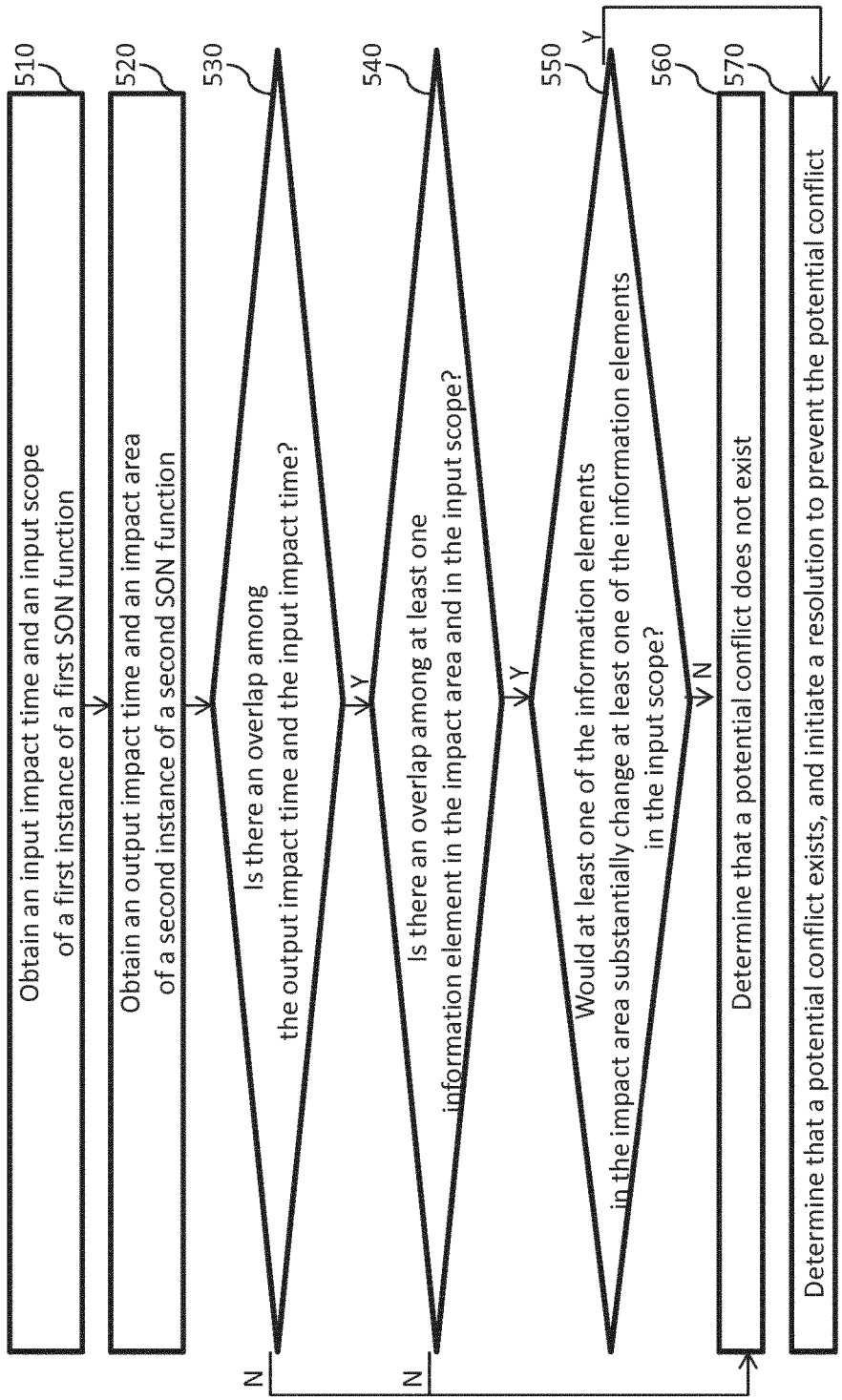
FIG. 5 is a flow chart illustrating a method to prevent a potential conflict among a first instance of a SON function and a second instance of a SON function, according to an example embodiment.

FIG. 5 illustrates yet another method 500 to prevent a potential conflict among a first instance of a first SON function, and a second instance of a second SON function. (Method 400 included a determination of whether the first instance conflicts with the second instance in a particular way. Method 500 includes a determination of whether the second instance conflicts with the first instance in the same particular way.)

At 510, an input impact time and an input scope of a first instance of a first SON function are obtained. In an example embodiment, any one of the input impact time and the input scope may be obtained by the processor executing method 500, from a database communicatively connected to that processor.

In another example embodiment, any one of the input impact time and an input scope of the first instance may be sent to the processor that is executing method 500, from another processor communicatively connected to that processor. Any one of the input impact time and the input scope, may be sent to the processor that is executing method 300, from another processor that is requesting to execute the first instance or requesting to output at least one information element by the first instance.

520 is next. At 520, an output impact time and an impact area of a second instance of a second SON function are obtained. In an example embodiment, the output impact time and an impact area of the second instance may be obtained by the processor executing method 500, from a database communicatively connected to that processor.

530 is next. At 530, whether there is an overlap among the output impact time of the second instance and the input impact time of the first instance, is determined. If there is an overlap, 540 is next. If there is not an overlap, 560 is next.

At 540, whether there is an overlap among at least one information element in the impact area of the second instance and in the input scope of the first instance, is determined. If there is an overlap, 550 is next. If there is not an overlap, 560 is next.

At 550, whether at least one of the information elements in the impact area of the second instance would substantially change at least one of the information elements in the input scope of the first instance, is determined. If at least one of the information elements in the input scope would be substantially changed, 570 is next. If none of the information elements in the input scope would be substantially changed, 560 is next.

At 560, it is determined that a potential conflict does not exist.

At 570, it is determined that a potential conflict exists, and a resolution to prevent the potential conflict is initiated.

Figure 6:
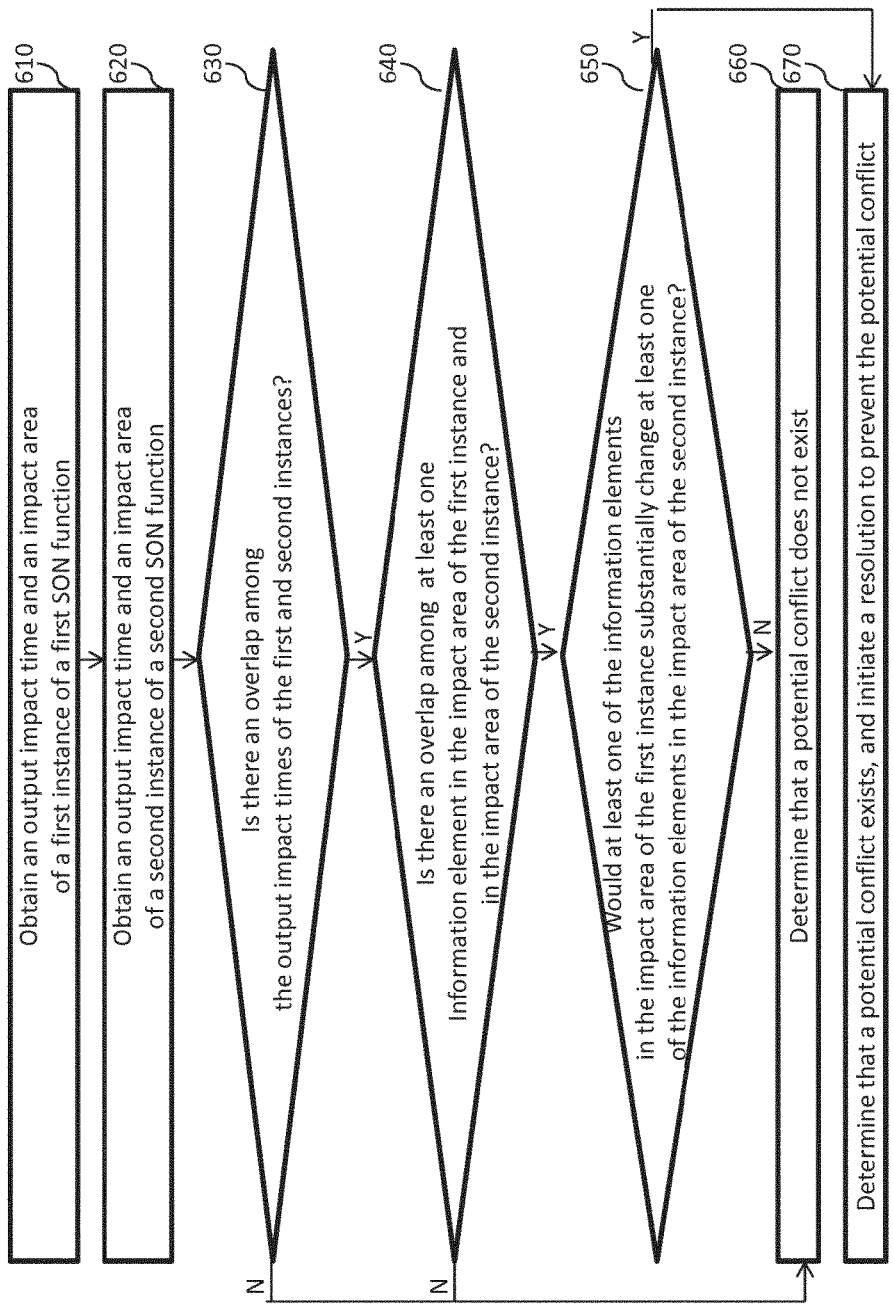
FIG. 6 is a flow chart illustrating a method to prevent a potential conflict among a first instance of a SON function and a second instance of a SON function, according to an example embodiment.

FIG. 6 illustrates another method 600 to prevent a potential conflict among a first instance of a first SON function, and a second instance of a second SON function.

At 610, an output impact time and an impact area of a first instance of a first SON function is obtained. In an example embodiment, any one of the output impact time and the impact area may be obtained by the processor executing method 600, from a database communicatively connected to that processor.

In another example embodiment, any one of the output impact time and the impact area may be sent to the processor that is executing method 600, from another processor communicatively connected to that processor. Any one of the output impact time and the impact area, may be sent to the processor that is executing method 600, from another processor that is requesting to execute the first instance or requesting to output at least one information element by the first instance.

620 is next. At 620, an output impact time and an impact area of a second instance of a second SON function is obtained. In an example embodiment, the output impact time and the impact area may be obtained by the processor executing method 600, from a database communicatively connected to that processor.

630 is next. At 630, whether there is an overlap among the output impact time of the first instance and the output impact time of the second instance, is determined. If there is an overlap, 640 is next. If there is not an overlap, 660 is next.

At 640, whether there is an overlap among at least one information element in the impact area of the first instance and in the impact area of the second instance, is determined. If there is an overlap, 650 is next. If there is not an overlap, 660 is next.

At 650, whether at least one of the information elements in the impact area of the first instance would substantially change at least one of the information elements in the in the impact area of the second instance, is determined. If at least one of the information elements in the impact area of the second instance would be substantially changed, 670 is next. If none of the information elements in the impact area of the second instance would be substantially changed, 660 is next.

At 660, it is determined that a potential conflict does not exist.

At 670, it is determined that a potential conflict exists, and a resolution to prevent the potential conflict is initiated.

Figure 7:
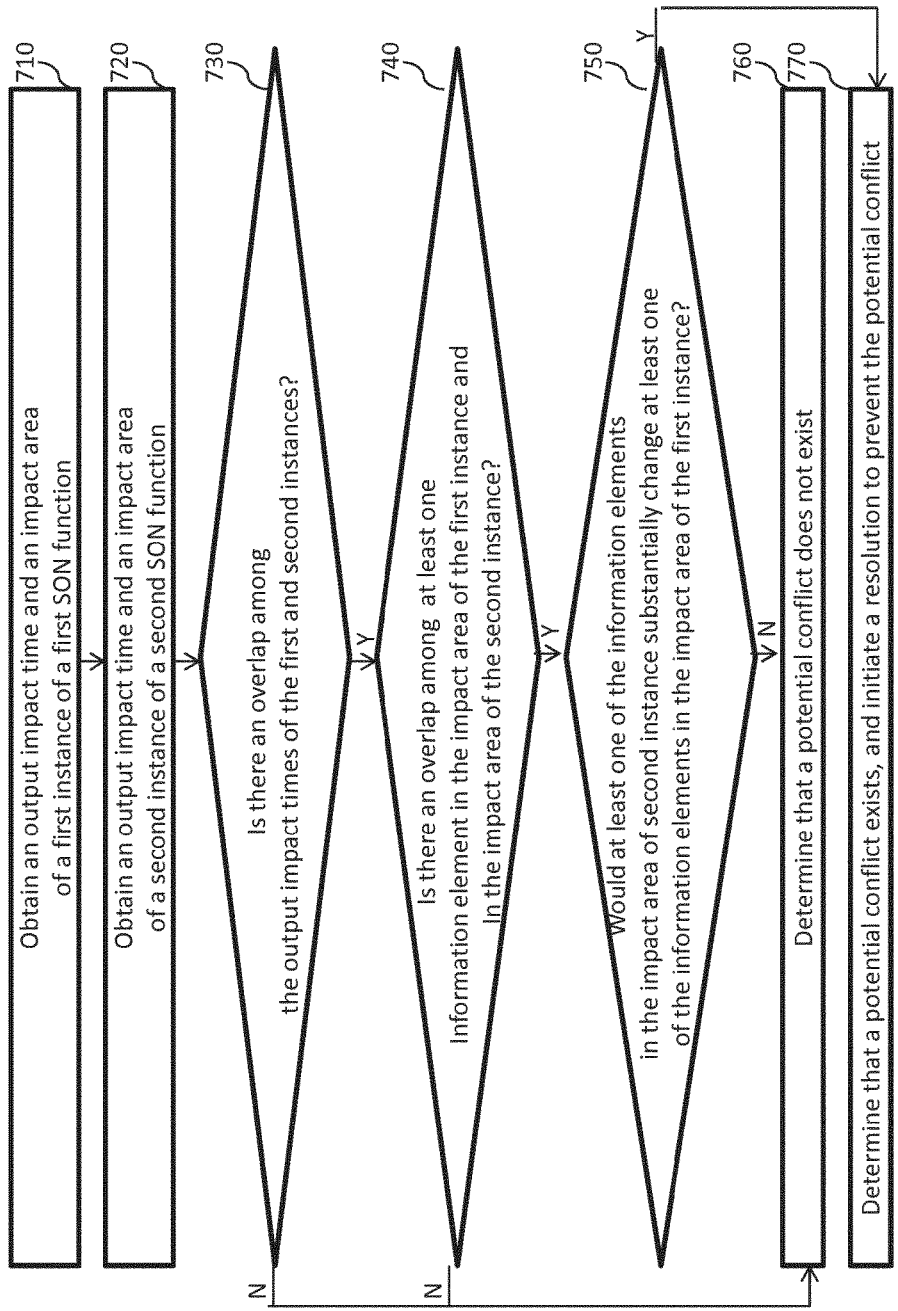
FIG. 7 is a flow chart illustrating a method to prevent a potential conflict among a first instance of a SON function and a second instance of a SON function, according to an example embodiment.

FIG. 7 illustrates yet another method 700 to prevent a potential conflict among a first instance of a first SON function, and a second instance of a second SON function. (Method 600 included a determination of whether the first instance conflicts with the second instance in a particular way. Method 700 includes a determination of whether the second instance conflicts with the first instance in the same particular way.)

At 710, an output impact time and an impact area of a first instance of a first SON function is obtained. In an example embodiment, any one of the output impact time and the impact area may be obtained by the processor executing method 700, from a database communicatively connected to that processor.

In another example embodiment, any one of the output impact time and the impact area may be sent to the processor that is executing method 700, from another processor communicatively connected to that processor. Any one of the output impact time and the impact area, may be sent to the processor that is executing method 700, from another processor that is requesting to execute the first instance and requesting to output at least one information element by the first instance.

720 is next. At 720, an output impact time and an impact area of a second instance of a second SON function is obtained. In an example embodiment, the output impact time and the impact area may be obtained by the processor executing method 700, from a database communicatively connected to that processor.

730 is next. At 730, whether there is an overlap among the output impact time of the first instance and the output impact time of the second instance, is determined. If there is an overlap, 740 is next. If there is not an overlap, 760 is next.

At 740, whether there is an overlap among at least one information element in the impact area of the first instance and in the impact area of the second instance, is determined. If there is an overlap, 750 is next. If there is not an overlap, 760 is next.

At 750, whether at least one of the information elements in the impact area of the second instance would substantially change at least one of the information elements in the impact area of the first instance, is determined. If at least one of the information next. If none of the information elements in the impact area of the first instance would be substantially changed, 760 is next.

At 760, it is determined that a potential conflict does not exist.

At 770, it is determined that a potential conflict exists, and a resolution to prevent the potential conflict is initiated.

In the methods 300-700 discussed above, particularly at 380, 470, 570, 670 and 770, example resolutions to prevent the potential conflict are: to not execute the first instance; to reject a request to output at least one information element by the SON function instance that is requesting to output the at least one information element; to execute the one of the first and second instances, that has a predetermined higher priority; to approve of a request to output at least one information element by one of the first and second instances, that has a predetermined higher priority; if the second instance is currently executing, to not execute the first instance; and if the second instance is currently executing, to reject a request to output at least one information element by the first instance.

In example embodiments, all of methods 300-700 are executed to determine and prevent any potential conflicts among the first and second instances. In another example embodiment, if after executing one of methods 300-700, it determined that a potential conflict exists, a resolution to prevent the potential conflict is initiated and the remaining of the methods 300-700 are not executed.

The blocks of methods 300-700 in FIGS. 3-7 are in no absolute chronological order, and some of the blocks may be performed simultaneously or in an order differing from the given one. Some of the blocks or part of the blocks can also be left out or replaced by a corresponding block or part of the blocks.

The terms "request" or "requesting", disclosed throughout the Detailed Description does not imply that a server-client or a master-slave approach is or needs to be used. The terms "requesting" and "request" can be defined as asking and the act of asking. Furthermore, the requests disclosed throughout the Detailed Description are only examples and may even include several separate communications for sending the same information. In addition, the requests may also contain other information.

It will be obvious to a person skilled in the art that, as technology advances, the inventive concept can be implemented in various ways. The invention and its embodiments are not limited to the examples described above but may vary within the scope of the claims.

The invention claimed is:

1. A processor implemented method to prevent a potential conflict among a first instance of a first self-organizing network ("SON") function residing in a domain, and a second instance of a second SON function residing in another domain, comprising:
   obtaining by the processor a first input impact time, a first input scope and a first objective of the first instance, and obtaining a second input impact time, a second input scope and a second objective of the second instance;
   determining if there is a first overlap among the first input impact time and the second input impact time;
   when there is the first overlap, determining if there is a second overlap among the first input scope and the second input scope;
   when there is the second overlap, determining if the first objective and the second objective are the same or substantially the same and if so, determining that the potential conflict exists;
   when there is the second overlap, when determining that the first objective and the second objective are not the same or not substantially the same, determining if the first objective contradicts or substantially contradicts with the second objective and if so, determining that the potential conflict exists; and when the potential conflict exists, initiating a resolution to prevent the potential conflict.

2. The method of claim 1, wherein the method is executed, in response to the processor receiving a request to execute the first instance or a request to output at least one information element by the first instance.

3. The method of claim 1, wherein the resolution to prevent the potential conflict is to not execute the first instance or to reject a request to output at least one information element by the first instance.

4. The method of claim 1, wherein the resolution to prevent the potential conflict is to not execute the first instance or to reject a request to output at least one information element by the first instance, if the second instance is currently executing.

5. The method of claim 1, wherein the resolution to prevent the potential conflict is to execute one of the first and second instances or to approve a request to output at least one information element by one of the first and second instances, that has a predetermined higher priority.

6. A computing device to prevent a potential conflict among a first instance of a SON function residing in a domain, and a second instance of a second SON function residing in another domain, comprising:

a processor configured to:

obtain a first input impact time, a first input scope and a first objective of the first instance;

obtain a second input impact time, a second input scope and a second objective of the second instance;

determine if there is a first overlap among the first input impact time and the second input impact time;

when there is the first overlap, determine if there is a second overlap among the first input scope and the second input scope;

when there is the second overlap, determine if the first objective and the second objective are the same or substantially the same and if so, determine that the potential conflict exists;

when there is the second overlap, when determining that the first objective and the second objective are not the same or not substantially the same, determine if the first objective contradicts or substantially contradicts with the second objective and if so, determine that the potential conflict exists; and when the potential conflict exists, initiate a resolution to prevent the potential conflict.

7. The computing device of claim 6, wherein the processor is further configured to prevent the potential conflict, in response to receiving a request to execute the first instance or a request to output at least one information element by the first instance.

8. The computing device of claim 6, wherein the resolution to prevent the potential conflict is to not execute the first instance or to reject a request to output at least one information element by the first instance.

9. The computing device of claim 6, wherein the resolution to prevent the potential conflict is to not execute the first instance or to reject a request to output at least one information element by the first instance, if the second instance is currently executing.

10. The computing device of claim 6, wherein the resolution to prevent the potential conflict is to execute one of the first and second instances or to approve a request to output at least one information element by one of the first and second instances, that has a predetermined higher priority.

11. A processor implemented method to prevent a potential conflict among a first instance of a first SON function residing in a domain, and a second instance of a second SON function residing in another domain, comprising:

obtaining by the processor a first input impact time, a first input scope and a first objective of the first instance, and obtaining a second input impact time, a second input scope and a second objective of the second instance;

determining if there is a first overlap among the first input impact time and the second input impact time;

when there is the first overlap, determining if there is a second overlap among the first input scope and the second input scope;

when there is the second overlap, when determining that the first objective and the second objective are not the same or not substantially the same, determining if the first objective contradicts or substantially contradicts with the second objective and if so, determining that the potential conflict exists; and when the potential conflict exists, initiating a resolution to prevent the potential conflict.

12. The method of claim 11, wherein the method is executed, in response to the processor receiving a request to execute the first instance or a request to output at least one of the information elements by the first instance.

13. The method of claim 11, wherein the resolution to prevent the potential conflict is to not execute the first instance or to reject a request to output at least one of the information elements by the first instance.

14. The method of claim 11, wherein the resolution to prevent the potential conflict is to not execute the first instance or to reject a request to output at least one of the information elements by the first instance, if the second instance is currently executing.

15. The method of claim 11, wherein the resolution to prevent the potential conflict is to execute one of the first and second instances or to approve a request to output at least one of the information elements by one of the first and second instances, that has a predetermined higher priority.

16. A computing device to prevent a potential conflict among a first instance of a first SON function residing in a domain, and a second instance of a second SON function residing in another domain, comprising:

a processor configured to:

obtain a first input impact time, a first input scope and a first objective of the first instance, and obtaining a second input impact time, a second input scope and a second objective of the second instance;

determine if there is a first overlap among the first input impact time and the second input impact time;

when there is the first overlap, determine if there is a second overlap among the first input scope and the second input scope;

when there is the second overlap, determine if the first objective and the second objective are the same or substantially the same and if so, determine that the potential conflict exists;

when there is the second overlap, when determining that the first objective and the second objective are not the same or not substantially the same, determine if the first objective contradicts or substantially contradicts with the second objective and if so, determine that the potential conflict exists; and when the potential conflict exists, initiate a resolution to prevent the potential conflict.

17. The computing device of claim 16, wherein the processor is further configured to prevent the potential conflict, in response to receiving a request to execute the first instance or a request to output at least one of the information elements by the first instance.

18. The computing device of claim 16, wherein the resolution to prevent the potential conflict is to not execute the first instance or to reject a request to output at least one of the information elements by the first instance.

19. The computing device of claim 16, wherein the resolution to prevent the potential conflict is to not execute the first instance or to reject a request to output at least one of the information elements by the first instance, if the second instance is currently executing.

20. The computing device of claim 16, wherein the resolution to prevent the potential conflict is to execute one of the first and second instances or to approve of a request to output at least one of the information elements by one of the first and second instances, that has a predetermined higher priority.

* * * * *